(12) United States Patent
Shilliday et al.

(10) Patent No.: US 6,886,469 B2
(45) Date of Patent: May 3, 2005

(54) DISTRIBUTED CHARGE INFLATOR SYSTEM

(75) Inventors: David Shilliday, Phoenix, AZ (US); Greg Scaven, Mesa, AZ (US); Kevin Fitzgerald, Mesa, AZ (US)

(73) Assignee: Zodiac Automotive US Inc., Tempe, AZ (US)

( * ) Notice: Subject to any disclaimer, the term of this patent is extended or adjusted under 35 U.S.C. 154(b) by 48 days.

(21) Appl. No.: 10/146,933

(22) Filed: May 17, 2002

(65) Prior Publication Data

US 2003/0213397 A1 Nov. 20, 2003

(51) Int. Cl.$^7$ .............................. C06D 5/00; B60R 21/16
(52) U.S. Cl. ..................... 102/530; 102/530; 288/728.1; 288/729; 288/733; 288/736; 288/743.1; 288/737
(58) Field of Search .................. 102/530, 537; 280/728.1, 736, 743.1, 729, 733, 737

(56) References Cited

U.S. PATENT DOCUMENTS

| | | | |
|---|---|---|---|
| 3,532,359 A | 10/1970 | Teague et al. | 280/741 |
| 3,606,377 A | 9/1971 | Martin | 280/741 |
| 3,724,870 A | 4/1973 | Kurokawa et al. | 280/741 |
| 3,776,570 A | 12/1973 | Weman | 280/738 |
| 4,200,615 A | 4/1980 | Hamilton et al. | 422/166 |
| 4,923,212 A | 5/1990 | Cuevas | 280/736 |
| 4,950,458 A | 8/1990 | Cunningham | 422/164 |
| 4,998,751 A | 3/1991 | Paxton et al. | 280/741 |
| 5,078,422 A | 1/1992 | Hamilton et al. | 280/736 |
| 5,131,680 A | 7/1992 | Coultas et al. | 280/737 |
| 5,282,648 A | 2/1994 | Peterson | 280/733 |
| 5,299,828 A | 4/1994 | Nakajima et al. | 280/741 |
| 5,322,322 A | 6/1994 | Bark et al. | 280/730 |
| 5,397,543 A | 3/1995 | Anderson | 422/165 |
| 5,443,286 A | 8/1995 | Cunningham et al. | 280/741 |
| 5,462,307 A | 10/1995 | Webber et al. | 280/737 |
| 5,464,246 A | 11/1995 | Castro et al. | 280/730.2 |
| 5,480,181 A | 1/1996 | Bark et al. | 280/730.2 |
| 5,483,896 A | 1/1996 | Hock et al. | 102/530 |
| 5,588,676 A | 12/1996 | Clark et al. | 280/741 |
| 5,623,115 A | 4/1997 | Lauritzen et al. | 102/288 |
| 5,660,412 A | 8/1997 | Renfroe et al. | 280/737 |
| 5,670,738 A | 9/1997 | Storey et al. | 102/530 |
| 5,738,374 A | 4/1998 | Marsaud et al. | 280/741 |
| 5,839,754 A | 11/1998 | Schluter et al. | 280/736 |
| 5,868,424 A | 2/1999 | Hamilton et al. | 280/741 |
| 5,967,550 A | 10/1999 | Shirk et al. | 280/736 |
| 5,970,880 A | 10/1999 | Perotto | 102/531 |
| 6,019,389 A | 2/2000 | Burgi et al. | 280/736 |
| 6,032,979 A | 3/2000 | Mossi et al. | 280/741 |
| 6,062,143 A | 5/2000 | Grace et al. | 280/729 |
| 6,066,017 A | 5/2000 | Max et al. | 441/98 |
| 6,073,961 A | 6/2000 | Bailey et al. | 280/730.2 |
| 6,095,559 A | 8/2000 | Smith et al. | 280/741 |
| 6,106,010 A | 8/2000 | Forbes et al. | 280/741 |
| 6,119,474 A | 9/2000 | Augustine et al. | 62/259.3 |
| 6,227,562 B1 | 5/2001 | Shirk et al. | 280/730.2 |
| 6,237,941 B1 | 5/2001 | Bailey et al. | 280/730.2 |
| 6,237,950 B1 | 5/2001 | Cook et al. | 280/736 |
| 6,308,984 B1 | 10/2001 | Fisher | 280/741 |
| 6,460,873 B1 | 10/2002 | Lebaudy et al. | 280/728.1 |
| 2003/0075904 A1 | 4/2003 | Lebaudy et al. | 280/737 |
| 2003/0075909 A1 | 4/2003 | Lebaudy et al. | 280/737 |

FOREIGN PATENT DOCUMENTS

| | | | |
|---|---|---|---|
| DE | 4211672 | 10/1993 | 280/733 |
| EP | 1069005 | 1/2001 | |
| EP | 00888932 | 2/2001 | |
| JP | 01151066 | 6/2001 | |
| WO | 99938725 | 8/1999 | |
| WO | WO 01/34516 A2 | 5/2001 | |

*Primary Examiner*—Jack Keith
(74) *Attorney, Agent, or Firm*—Dean W. Russell; Kilpatrick Stockton LLP

(57) ABSTRACT

An inflatable system includes a first charge distributed within an inflatable component and a housing body connected to the first charge including a second charge and an initiator. Upon receiving a signal from a sensor, the initiator ignites the first charge and the second charge simultaneously. The first charge inflates the inflatable component and the second charge sustains the inflation.

12 Claims, 5 Drawing Sheets

DISTRIBUTED CHARGE INFLATOR SYSTEM

BACKGROUND

1. Field of the Invention

The present invention relates generally to the field of gas-generating devices for inflatable systems, and particularly to those used in inflatable restraint systems.

2. Background of the Invention

Prior art inflatable systems typically use an initiator (such as an electronic squib) and a booster material (such as boron potassium nitrate) to ignite a surrounding, much larger quantity of gas-generating propellant material (such as sodium azide, potassium nitrate or ammonium nitrate, and binders). The gas-generating propellant serves as the primary means by which sufficient gas is produced to deploy the inflatable system. The initiator, the booster material, and the surrounding gas-generating propellant are typically all confined within a metallic structure or assembly, the whole of which forms the "gas generator" which produces inflating gas for an inflatable component (such as an air bag in a passenger vehicle).

This gas generator assembly typically contains one or more internal chambers or baffles, as well as one or more internal sets of filters, which are designed to: (a) control the burn rate of the propellant and the gas mass flow rate, (b) reduce the temperature of the gases produced by the burning of the gas-generating material, and (c) filter out accelerated particles before the gases pass through vents in the assembly and into the airbag itself.

The gas generator is typically located in a position external to the inflatable component (e.g. an airbag) itself, and is attached to the inflatable component by a conduit through which the generated gases flow into the inflatable component, causing the inflatable component to deploy.

Such prior art systems are disclosed, for example, in U.S. Pat. No. 5,738,374 (a pyrotechnic gas generator for an air bag using an annular charge of a mixture of ammonium perchlorate and sodium nitrate, with a silicone binder); U.S. Pat. No. 5,623,115 (a gas generator including a pyrogen igniter enclosing a unitary grain of ignition material, with a squib located to ignite the unitary grain); U.S. Pat. No. 5,483,896 (a housing for a pyrotechnic inflator which serves as a filter for entrapping contaminants and as a cooler by absorbing heat from the generated gas); U.S. Pat. No. 5,443,286 (a gas generating cartridge surrounded by filtering and cooling screens); U.S. Pat. No. 4,200,615 (a linear igniter and pyrotechnic material extending longitudinally within an elongated enclosure); U.S. Pat. No. 4,950,458 (a two-stage gas generator, in which each stage includes a combustion chamber with an igniter); and U.S. Pat. No. 4,923,212 (a lightweight pyrotechnic inflator consisting of six component parts, including mechanical parts, a filter, a propellant assembly and an initiator).

Hybrid inflators such as the inflators disclosed in U.S. Pat. No. 5,670,738 (a hybrid inflator using compressed gas together with an initiator and a pyrotechnic gas generator), U.S. Pat. No. 5,660,412 (a hybrid inflator consisting of a pressure vessel containing a main charge of pyrotechnic material and a secondary charge of pyrotechnic material, wherein the secondary charge produces products of combustion that ignite the main charge), U.S. Pat. No. 5,588,676 (a hybrid inflator with a pyrotechnic gas generator and a gas chamber storing pressurized gas), U.S. Pat. No. 5,462,307 (a hybrid air bag inflator with a first chamber containing compressed gas and a second chamber containing an igniter and pyrotechnic material) and U.S. Pat. No. 5,131,680 (an inflator assembly which includes pyrotechnic material and a container of gas under pressure) also use gas generating units that are completely separate from and external to the inflatable component (e.g., the air bag) itself.

U.S. Pat. No. 6,062,143, which is assigned to the assignee of the present application and is incorporated herein by reference, discloses a distributed charge inflator. The distributed charge inflator generally includes a distributed gas-generating material, that may have a faster burning center core ignition material surrounded by supplemental propellant, or uses a homogenous mixture of ignition material and propellant, and also includes an initiator (e.g., an electronic squib) used to ignite the gas generating material upon a signal from an initiating device. The fast burning gas generating material or "distributed charge" is designed to be installed within and distributed along the interior of the undeployed inflatable component itself. It is not necessary to contain the distributed charge inflator (DCI) within any type of exterior housing or assembly. The distributed charge inflator is simpler and less expensive to manufacture than the prior art systems listed above, because it does not require the complicated series of chambers, baffles, or filters. Also, because distributed charge inflator is distributed, rather than confined to a small enclosed container as in the prior art systems listed above, it generates gases and releases the generated gases with far less explosive force than in the prior art systems. The internal distributed charge inflator system virtually eliminates the uneven inflations, pressure waves, and inertial effects of gases injected into the inflatable components from externally located gas generators. Moreover, the distributed charge inflator equipped inflatable restraints deploy less aggressively than existing systems because the energy of the expanding gases is essentially distributed uniformly throughout the inflatable structure during deployment.

Further, because the distributed charge inflator is distributed internally within the inflatable component, there is no necessity to reinforce the inflatable fabric or bladder material against pressure, heat and high velocity particulates at the point at which gases would have been forcefully injected into the inflatable component from the gas generator external to the inflatable component. Furthermore, there is no need for a reinforced fill tube, or other means for providing a secure conduit from the gas generator to the inflatable component.

An additional advantage is that it can be readily scaled to the particular application. Almost every different vehicle platform or different application requires a different volume of the inflating gas, or a different rate of inflation.

The distributed charge inflator is not limited to simply propagating the rapid ignition of other materials, the burning of which then produces the quantities of gas necessary to inflate a given structure. The distributed charge inflator system is a complete, autonomously-operating inflation system.

Example of inflatable components which the distributed charge inflator can be used to inflate are described in U.S. Pat. No. 5,282,648 (body and head restraints); U.S. Pat. No. 5,322,322 (side impact head strike protection); U.S. Pat. No. 5,480,181 (side impact head strike protection); and U.S. Pat. No. 5,464,246 (tubular cushions), which are incorporated herein by reference, as well as automotive air bags and other inflatable products.

SUMMARY OF THE INVENTION

The present invention is an improved inflator system that can be used in conjunction with a wide variety of inflatable systems such as inflatable restraint systems, inflatable flotation systems, or passive inflatable safety systems.

The inflator is typically activated by an electronic sensor (for example, by an electronic crash sensor when the inflatable component is an air bag or other safety equipment which must be deployed in the event of a crash). However, the inflator may also be activated, for example, by another type of automatic device, or it may be activated by a mechanical device such as a button or switch or handle which is pushed, switched or pulled, respectively, by a user to deploy the inflatable component. For example, deployment of a life raft may be activated automatically by a sensor detecting immersion of the life raft in water, or it may be activated by a user pulling a handle. The device (crash sensor, mechanical device, button, switch, handle, water sensor or other device) that activates the inflation of the system will be refereed to herein as the "activator."

An inflatable system includes an inflatable component, a first charge distributed within the inflatable component, and a housing body connected to the first charge including a second charge and an initiator. The second charge has longer burn time than the first time. Upon receiving a signal from a sensor, the initiator ignites the first charge and the second charge simultaneously. The first charge inflates the inflatable component and the second charge sustains the inflation. The second charge may assume any desired state, such as gas, solid or liquid, and any desired shape, such as cylindrical, longitudinal, or segmented.

DETAILED DESCRIPTION OF THE INVENTION

Reference will now be made in detail to the preferred embodiments of the present invention, examples of which are illustrated in the accompanying drawings.

Figure 1:
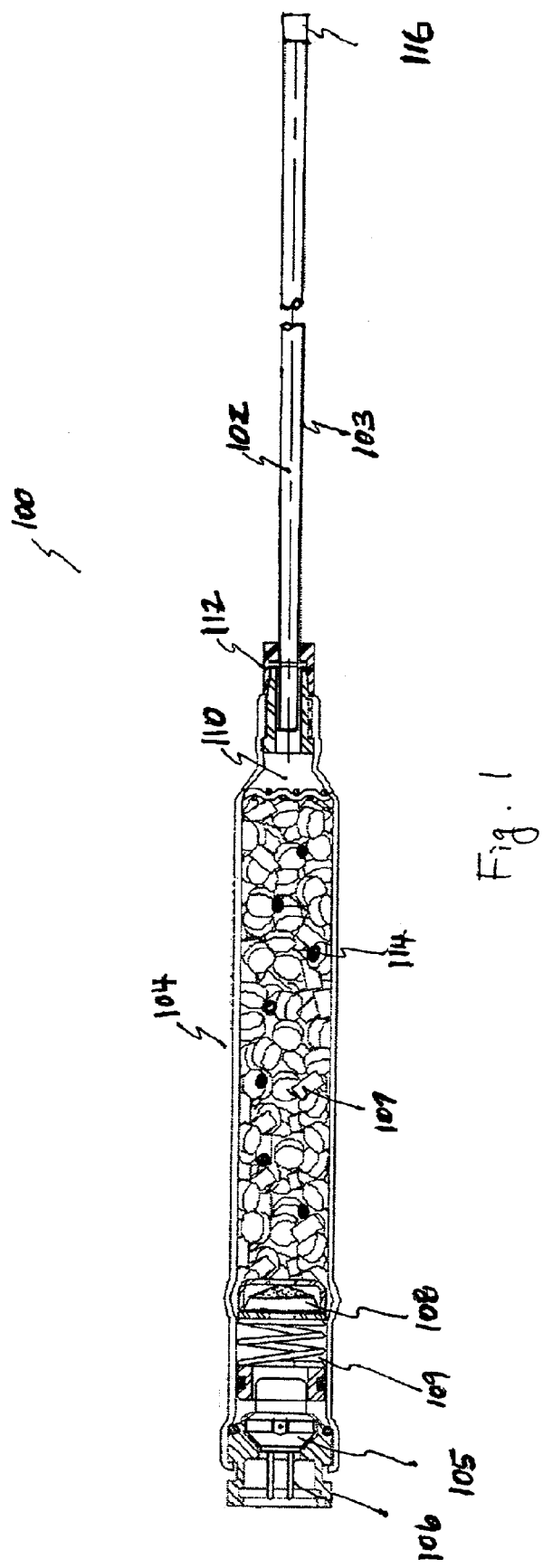
FIG. 1 is a schematic diagram of a distributed charge assembly according to a preferred embodiment of the present invention.

FIG. 1 shows a distributed charge assembly according to a preferred embodiment of the present invention.

As shown, distributed charge assembly 100 includes a distributed charge 102 and a housing body 104. Optionally, as shown in FIG. 1, distributed charge 102 is enclosed in a sheath 103. Preferably, distributed charge assembly 100 also includes an end cap seal 116. End cap seal 116, for example, can be in form of o-ring, gaskets or other appropriate forms which serve to seal against moisture and contamination. For example, end cap seal 116 can be made of rubber, RTV and/or metals.

Housing body 104 includes an initiator 105, connector pins 106 and a sustainer 107. Connector pins 106 are used to electrically connect distributed charge assembly 100 to a crash sensor or other activator. Initiator 105, for example, includes an electronic squib, such as the electric squibs used to initiate deployment of an automotive air bag. Sustainer 107 can assume any desired state, such as gas, solid or liquid, and desired shape. For example, the sustainer can be in form of pills, tablets or compressed gas. Also, the sustainer can be formed by extrusion and cut to the appropriate length. In the embodiment shown in FIG. 1, sustainer 107 is in form of pills. Nitrocellulose or guadinium nitrate composition, for example, can be used as sustainer 107. Preferably, sustainer 107 exhibits relatively long burn times (typically between 50 to 500 ms, preferably 200 ms). Sustainer 107 is held and supported by a retaining ring 108 and a spring 109 in housing body 104. Spring 109 accommodates for different loads of sustainer 107 to suit the specific application. Other elastic materials or mechanisms can be used as alternatives to spring 109.

Housing body 104 also includes a nozzle screen 110 and a ferrule 112. Ferrule 112 controls the output and joins housing body 104 to distributed charge 102 by mechanically holding the distributed charge. Nozzle screen 110 retains sustainer 107 in the housing body 104. Optionally, housing body 104 may include a booster 114 to help the ignition of the distributed charge. For example, boron potassium nitrate ($BKNO_3$) can be used as booster 114.

Distributed charge 102 can be a solid monolithic block of pyrotechnic materials formed into the desired configuration using binders. In an embodiment, the pyrotechnic material (with or with out binders) can be enclosed by an exterior sheath, layer or coating for environmental protection. For example, the base distributed charge inflator may be a mixture of ammonium, guadinium, and/or triaminoguadinium salts of decahydrodecaboric acid and inorganic oxidizers such as ammonium nitrate and/or potassium nitrate. Representative compositions include 5–30% by weight of the decahydrodecaborate salt and 70–90% by weight of the nitrate salt. The additional materials may be used to coat, wrap, tape, or sheath the base distributed charge inflator prior to installation of the overall distributed charge inflator in the inflatable system.

Figure 2:
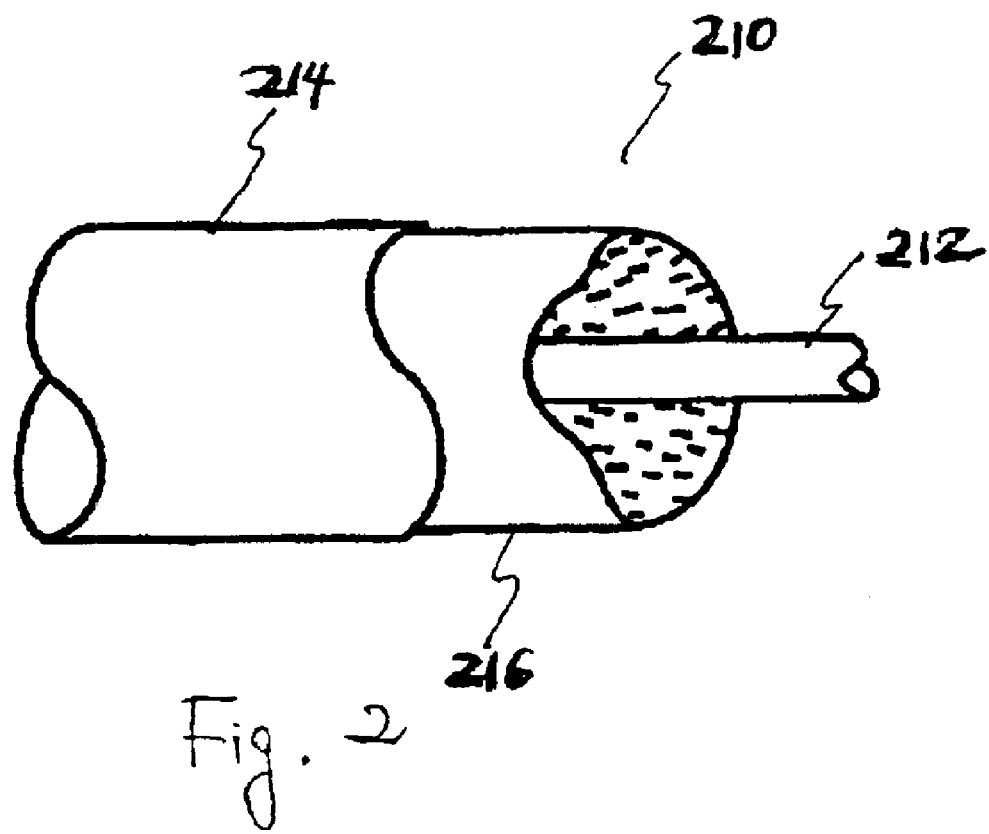
FIG. 2 is a schematic diagram of a distributed charge according to a preferred embodiment of the present invention.

Alternatively, the distributed charge can include a core of ignition material and a sheath. FIG. 2 shows a distributed charge 210 including a core of ignition material 212 and a sheath 214. Optionally, distributed charge 210 may, also an alternatively, include a gas generating layer or coating 216. Ignition material 212 is a moldable, formable, or extrudable rapidly burning pyrotechnic material, such as hydroborate fuel with various nitrate oxidizers (e.g., Rapid Deflagrating Cord (RDC) manufactured by Teledyne McCormick-Selph, Inc.), or secondary explosives loaded into a metal sheath (e.g., Mild Detonating Fuse (MDF), also known as Low Energy Detonating Cord or LEDC, manufactured by the Ensign Bickford Company of Simsbury, Conn.), as disclosed in the U.S. Pat. No. 6,062,143, which is incorporated herein by reference.

Materials for the optional gas-generating layer or coating 216 include alkali metal azides and organic azides with polymer binders, oxidizers, and metals used as the coating sheath or binder. For example, one possible composition for a particular application might be a mixture of 20–50% by weight sodium azide, 25–35% by weight of potassium nitrate, 10–15% by weight of a fluoroelastomer binder, and 15–25% by weight of magnesium.

Optionally, energetic propellants and explosives can also be added to the distributed charge composition or to the coating or wrapping. For example, butanetriol trinitrate (BTTN), pentaerythritol tetranitrate (PETN), cyclotrimethylene trinitramine (RDX), cyclotetramethylene tetranitramine (HMX), metriol trinitrate (MTN), trinitrotoluene, nitroglycerine, or inorganic oxidizers, hexanitrostilbene (HNS), dipicramid (DIPAM), or inorganic oxidizers such as potassium nitrate, with metals such as magnesium can be used. Alternatively, the energetic propellants and the explosives can be used as a sustainer.

Polymer binders which may be used to bind the distributed charge include: fluoroelastomers, crosslinked polybutadiene rubber, crosslinked polyacrylic rubber, crosslinked polyurethane elastomers, and polyvinyl alcohol/acetate. Energetic or gas-generating polymers which may be employed in the distributed charge assembly include: glycidyl nitrate polymers, glycidyl azide polymer, polytetrazoles, polytriazoles, nitrocellulose, dinitropolystyrene, nitrated polybutadienes, and nitrated polyethers.

The environmentally-sealed sheath 214 enclosing the distributed charge may be fabricated from ductile, easily extrudable metals such as tin (preferably) or silver, antimony or copper, or plastics such as polyethylene, polyurethane elastomer or fluoroelastomers. The sheath is designed to encapsulate and protect the energetic gas-generating materials to allow uniform vaporization or burning. The sheath splits open or vaporizes following the ignition of the distributed charge. The distributed charge, the gas generating layer, and the sheath can be formed into a wide variety of shapes and sizes to suit the specific application.

Figure 3:
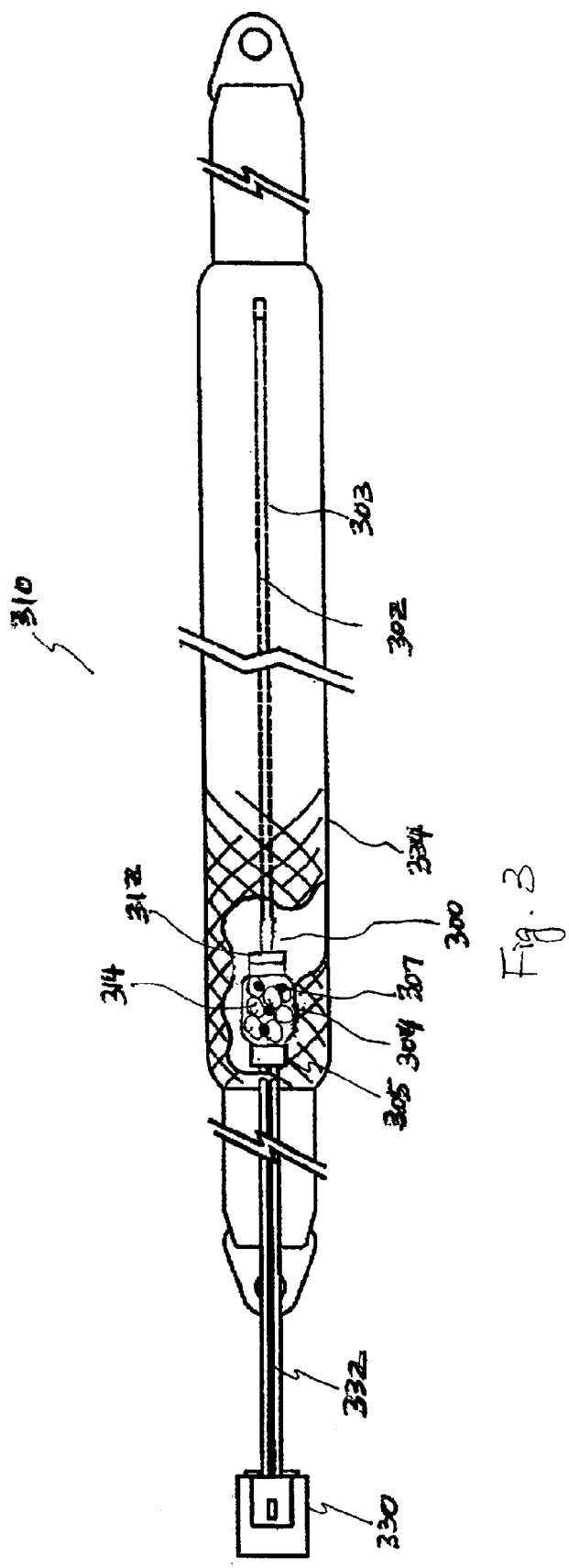
FIG. 3 is a schematic diagram of an inflatable system according to a preferred embodiment of the present invention.

FIG. 3 shows an inflatable system according to a preferred embodiment of the present invention.

As shown, inflatable system 310 includes an inflatable component 334 and a distributed charge assembly 300 including a distributed charge 302 and a housing body 304. Housing body 304 includes an initiator 305 and a sustainer 307. Inflatable system 310 receives an electric signal from an activator 330 along a wire 332, when a crash sensor or other activator determines that the inflatable component must be deployed. Upon receiving the electrical signal, initiator 305 ignites distributed charge 302, generates inflating gas, thus deploys inflatable component 334.

Preferably, the explosion of initiator 305 is effective enough to initiate combustion of both sustainer 307 and distributed charge 302. Combustion of distributed charge 302 generates a high volume of gas which ruptures sheath 303 and inflates inflatable component 334 from stowed to deployed conditions. The distributed charge typically combusts over a relatively short time interval (typically between 1 and 20 ms, preferably 5 ms). To maintain inflation of the inflatable component, the sustainer is provided to combust over a relatively longer interval (typically between 50 to 500 ms, preferably 200 ms). The gas generated from combustion of the sustainer can be vented from the housing through ferrule 312. Optionally, a booster 314 can be included in housing body 300 to assist ignition of the distributed charge. The length of the time intervals over which the distributed charge and the sustainer are combusted can be selected for the particular application. For example, the inflatable component for a side-impact protection system for a sports utility vehicle needs to become fully inflated within 15 ms, and needs to remain inflated for at least 2.5 seconds, preferably as long as 7 seconds or more so that it can protect its occupants in a rollover. Preferably, the inflatable component for front impact protection system should become fully inflated within 30 ms and should remain inflated for 100 ms.

The inflatable cushion, bag, flotation device, or other inflatable structure which the distributed charge inflator is designed to deploy may be composed of fabrics such as polyester, nylon, aramid, or other fibers; or such fabrics coated with polyurethane, silicone, or other materials; bladders fabricated from polyurethane elastomers, silicone elastomers, neoprene or vinyl rubbers; or such bladder materials contained in braided fabrics such as nylon, aramid, mylar, polyester, or other thin film materials.

The distributed charge inflator may be manufactured in various sizes and configurations, depending upon the inflation requirements of the system for which it is intended. These may range from a foil or thin film, or linear or tubular shaped charges to broad flat sheets of distributed charge inflator material which may be cut, trimmed, or otherwise fitted. The distributed charge inflator material, whether in a linear or sheet form, may, in cross-section, be circular, wedge-shaped, diamond-shaped, "L' shaped, or formed in any number of other configurations. Because of this flexibility and the inherent simplicity of the invention, the distributed charge inflator is easier to install and less expensive to manufacture than gas generator systems currently in use.

The distributed charge inflator can be designed so that, depending on the pattern of distribution of the distributed charge within a given inflatable system, the rate at which different distributed charge inflator sections are ignited, and the number or location of the electronic squibs used to ignite the material, variable inflation rates and effective total gas volumes may be achieved. The materials used for the distributed charge inflator should be flexible and pliable, such that they will not fracture or flow under normal operating conditions.

Figure 4:
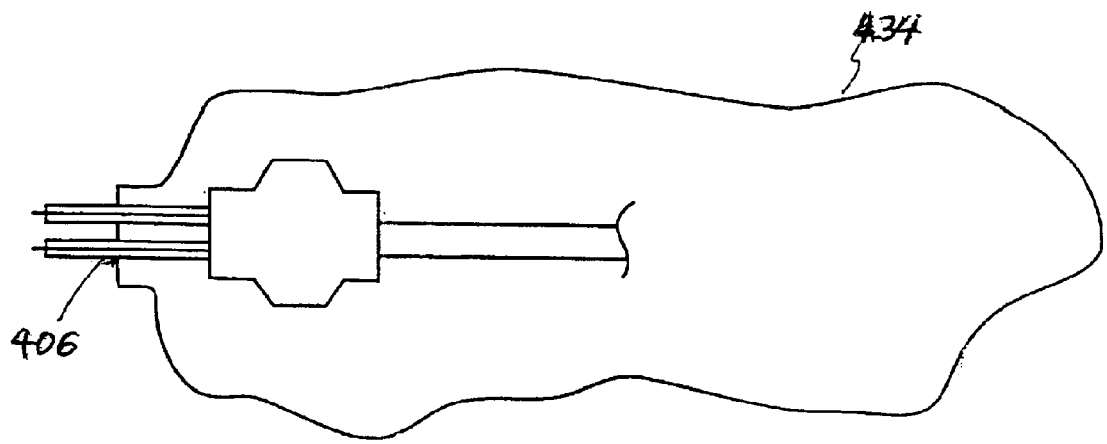
FIGS. 4 and 5 are schematic diagrams of an exemplary implementation of the present invention.
Figure 5:
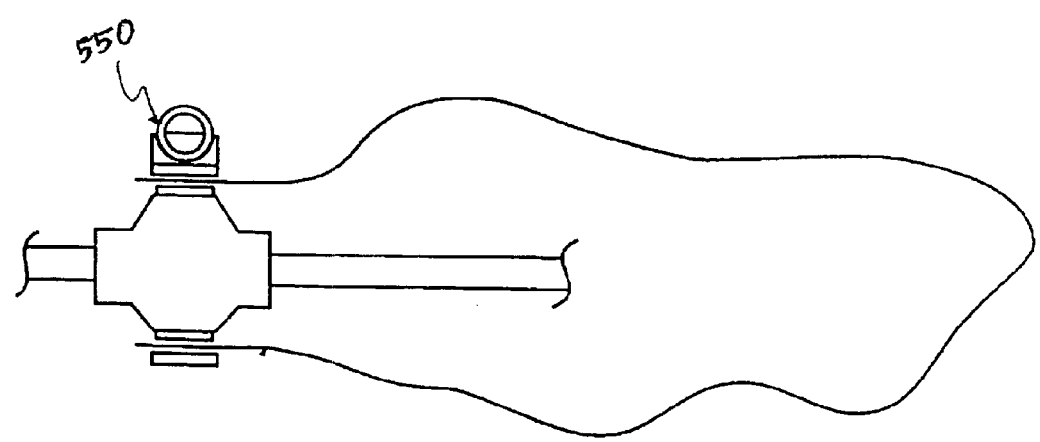

FIGS. 4 and 5 show exemplary implementations of the present invention.

As shown in FIG. 4, distributed charge assembly can be placed inside of inflatable component 434 and sealed so that the pins of the electronic squib 406 or other initiator are exposed. Alternatively, distributed charge assembly can be sealed inside of the inflatable component using, for example, band clamp 550, as shown in FIG. 5.

Figure 6:
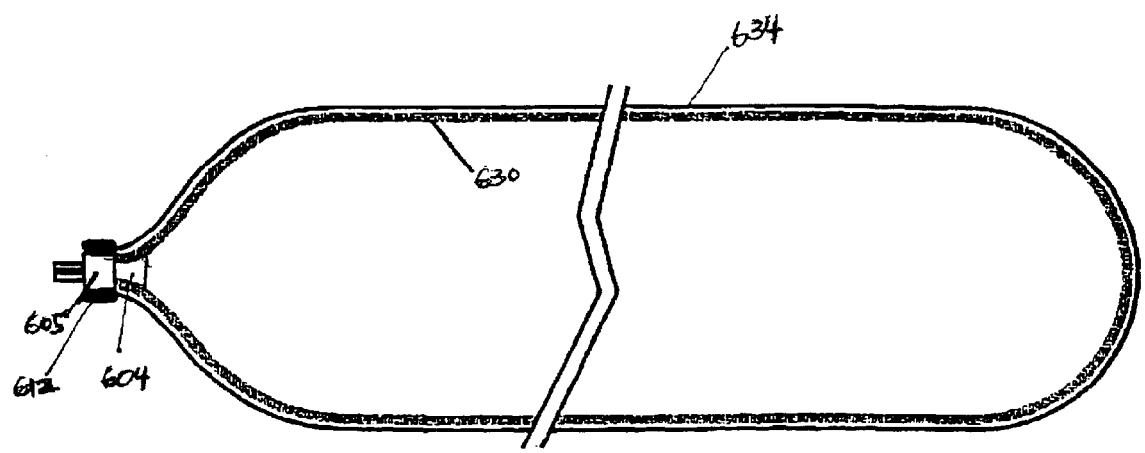
FIG. 6 is a schematic diagram of an inflatable system according to another embodiment of the present invention.

FIG. 6 shows an inflatable system according to another embodiment of the present invention.

As shown, inflatable component 634 is internally coated with a gas generating material 630. The composition of the gas generating material is the same as the composition of the distributed charge inflator described above, except that no external sheath is used. The gas generating material can be applied to the inflatable component either prior to or after the air bag is assembled. Initiator 605 provides ignition of gas generating material 630 and sustainer 604. Clamp 612 seals the inflatable component 634 to initiator 605.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. An inflatable system comprising:

an inflatable component;

a first charge distributed within the inflatable component;

a housing body connected to the first charge, and wherein (i) the housing body includes a second charge and an initiator for igniting the first charge and the second charge and (ii) the inflatable component comprises expandable material surrounding the first charge.

2. The system according to claim 1, wherein a burn time of the second charge is slower than a burn time of the first charge.

3. The system according to claim 1, wherein the initiator ignites the first charge and the second charge simultaneously.

4. The system according to claim 1, wherein the housing body further includes a spring to support a different load of the second charge.

5. The system according to claim 1, wherein the housing body further includes a joining member joining the housing body to the first charge.

6. The system according to claim 1, wherein the first charge inflates the inflatable component and the second charge sustains the inflation of the inflatable component.

7. The system according to claim 1, wherein the system further includes a third charge to boost the ignition of the first charge.

8. The system according to claim 1 in which the expandable material is formed of fabric.

9. An inflatable system comprising:

an inflatable component;

a first charge distributed within the inflatable component; and a housing body including a second charge, said housing body being connected to the first charge, wherein (i) a burn time of the second charge is slower than a burn time of the first charge and (ii) the inflatable component comprises expandable material surrounding the first charge.

10. The system according to claim 9 in which the expandable material is formed of fabric.

11. An inflatable system comprising:

an inflatable component;

a first charge distributed within the inflatable component;

a housing body including a second charge, said housing body being connected to the first charge, and an initiator; and wherein (i) a burn time of the second charge is slower than a burn time of the first charge and (ii) the initiator is in gaseous communication with both the first charge and the second charge so as to ignite both charges simultaneously.

12. An inflatable system comprising:

an inflatable component;

a first charge distributed within the inflatable component;

a housing body connected to the first charge, and wherein (i) the housing body includes a second charge and an initiator for igniting the first charge and the second charge and (ii) the initiator is in gaseous communication with both the first charge and the second charge so as to ignite both charges simultaneously.

* * * * *